(12) United States Patent
Matsuda et al.

(10) Patent No.: US 11,433,771 B2
(45) Date of Patent: Sep. 6, 2022

(54) ELECTRIC TRAVELLING VEHICLE AND GRASS MOWER

(71) Applicant: Kubota Corporation, Osaka (JP)

(72) Inventors: Kazuaki Matsuda, Sakai (JP); Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 28 days.

(21) Appl. No.: 17/078,168

(22) Filed: Oct. 23, 2020

(65) Prior Publication Data

US 2021/0039501 A1 Feb. 11, 2021

Related U.S. Application Data

(62) Division of application No. 15/993,854, filed on May 31, 2018, now Pat. No. 10,850,622.

(30) Foreign Application Priority Data

Oct. 16, 2017 (JP) .............................. JP2017-200282
Oct. 26, 2017 (JP) .............................. JP2017-207189

(51) Int. Cl.
*B60L 7/24* (2006.01)
*A01D 34/78* (2006.01)
(Continued)

(52) U.S. Cl.
CPC ................ *B60L 7/24* (2013.01); *A01D 34/66* (2013.01); *A01D 34/6806* (2013.01); *A01D 34/78* (2013.01); *A01D 69/02* (2013.01); *B60L 1/003* (2013.01); *B60T 1/005* (2013.01); *B60T 8/17* (2013.01); *B60T 13/74* (2013.01); *B60T 17/18* (2013.01); *F16D 59/02* (2013.01);
(Continued)

(58) Field of Classification Search
CPC ........ B60L 7/24; B60L 1/003; B60L 2200/40; B60L 2240/36; B60T 8/17; B60T 13/74; B60T 17/18; A01D 34/006; A01D 2101/00
USPC .......................................................... 701/22
See application file for complete search history.

(56) References Cited

U.S. PATENT DOCUMENTS

2009/0065273 A1* 3/2009 Wyatt ................... H04L 12/403
180/65.8
2012/0159916 A1* 6/2012 Ishii ....................... B60L 8/003
56/10.2 A
(Continued)

FOREIGN PATENT DOCUMENTS

EP 2664488 A1 11/2013
JP H6098407 A 9/1992
(Continued)

*Primary Examiner* — Yazan A Soofi
(74) *Attorney, Agent, or Firm* — The Webb Law Firm

(57) ABSTRACT

An electric travelling vehicle including: a motor controller configured to control an electric motor based on displacement of a steering operation part to a forward travel position, a neutral position, and a rearward travel position, a brake controller configured to bring an electromagnetic power-off (Continued)

brake into a released state or a braking state; and a travel state detector configured to detect a travelling state that is accompanied with the released state, a stopped state that is accompanied with the braking state, and a transit stopped state that is accompanied with the braking state.

4 Claims, 10 Drawing Sheets

(51) Int. Cl.

| | | |
|---|---|---|
| *B60T 1/00* | (2006.01) | |
| *B60T 13/74* | (2006.01) | |
| *F16D 59/02* | (2006.01) | |
| *B60T 17/18* | (2006.01) | |
| *B60T 8/17* | (2006.01) | |
| *A01D 34/66* | (2006.01) | |
| *A01D 34/68* | (2006.01) | |
| *A01D 69/02* | (2006.01) | |
| *B60L 1/00* | (2006.01) | |
| *A01D 34/00* | (2006.01) | |
| *A01D 101/00* | (2006.01) | |

(52) U.S. Cl.
CPC ........ *A01D 34/006* (2013.01); *A01D 2101/00* (2013.01); *B60L 2200/22* (2013.01); *B60L 2200/40* (2013.01); *B60L 2240/36* (2013.01); *B60W 2300/156* (2013.01); *B60Y 2200/223* (2013.01)

(56) References Cited

U.S. PATENT DOCUMENTS

| | | | |
|---|---|---|---|
| 2012/0227368 A1* | 9/2012 | Koike ................ | B60K 7/0007 56/10.2 A |
| 2015/0081153 A1* | 3/2015 | Wyatt ..................... | B60L 3/00 701/22 |
| 2016/0295797 A1* | 10/2016 | Ito ........................ | A01D 34/008 |
| 2017/0079210 A1* | 3/2017 | Yoshimatsu ............ | F02D 29/02 |

FOREIGN PATENT DOCUMENTS

| | | |
|---|---|---|
| JP | H7186914 A | 12/1993 |
| JP | H618973 U | 3/1994 |
| JP | H9196131 A | 7/1997 |
| JP | 10164705 A | 6/1998 |
| JP | 200023531 A | 1/2000 |
| JP | 2002354603 A | 12/2002 |
| JP | 201230323 A | 2/2012 |
| JP | 2012187026 A | 10/2012 |
| JP | 5843214 B2 | 1/2016 |
| JP | 20161585594 A | 9/2016 |
| JP | 2017104142 A | 6/2017 |

* cited by examiner

ELECTRIC TRAVELLING VEHICLE AND GRASS MOWER

CROSS-REFERENCE TO RELATED APPLICATIONS

This application is a divisional of U.S. patent application Ser. No. 15/993,854, filed on May 31, 2018, which claims priority to Japanese Patent Application Nos. 2017-200282 and 2017-207189, filed Oct. 16, 2017 and Oct. 26, 2017, respectively, the disclosures of which are hereby incorporated by reference in their entireties.

BACKGROUND OF THE INVENTION

1. Field of the Invention

The present invention relates to an electric travelling vehicle including: drive wheels that are driven by power from a power device; and a steering operation part, the power device including electric motors that are driven by being excited, and electromagnetic power-off brakes. The present invention also relates to a grass mower, which is, for example, an electric travelling vehicle that is equipped with a mower unit that rotates cutter blades, using a mower motor.

2. Description of the Related Art

In an electric travelling vehicle according to Patent Document 1, the travel driving system that rotates drive wheels using an electric motor is provided with an electromagnetic brake, and upon the electric motor being driven in response to a manual operation performed using an accelerator, the electromagnetic brake simultaneously cancels braking on the travel driving system. Also, upon an operation performed using the accelerator being stopped, the electromagnetic brake simultaneously activates braking on the travel driving system. This electric travelling vehicle is also provided with a manual switch that is used to activate or cancel braking performed by the electromagnetic brake. That is, in this electric travelling vehicle, starting of power supply to the electromagnetic brake (brake cancellation) and stopping of power supply to the electromagnetic brake (brake activation) are triggered by a manual operation, and are performed simultaneously with this operation.

The electromagnetic brake that is provided on a motor shaft of the electric motor of the electric travelling vehicle, or on a transmission shaft coupled to the motor shaft, is an electromagnetic power-off brake that is provided with a brake spring that presses an armature against a brake disk using a biasing spring force, and an electromagnetic coil that releases the armature from the brake disk using an electromagnetic force. An electromagnetic power-off brake is in a braking state when the coil of the electromagnetic brake is not excited, due to a spring or the like, and is in a released state when the coil of the electromagnetic brake is excited. Therefore, an electromagnetic power-off brake requires excitation the entire time the vehicle travels, and there is an issue of high power consumption. Since the capacity of an on-board battery is limited, power consumption is a significant issue for an electric travelling vehicle. In addition, a premature braking action performed by an electromagnetic power-off brake places an unnecessary load on the electric motor and the brake shaft.

In a grass mower, the driver's seat is located in an upper portion of a travelling machine body, and a mower unit is located in a lower portion of the travelling machine body. Therefore, it is difficult for the driver sitting on the driver's seat to check the driving state of the mower unit. Thus, technology for avoiding issues by using a detection signal from a sensor that monitors the driving state of the mower unit has been proposed. For example, in an electric lawn mower according to Patent Document 2, a load applied to a mower motor that rotates cutter blades is calculated, and the travel speed is reduced when the load exceeds a threshold value. Also, an electric lawn mower according to Patent Document 3 is provided with: a mower motor that rotates cutter blades; a thermostat that detects the temperature of the motor; a cooling flow path that cools the mower motor; and a cover that opens and closes the cooling flow path, and when the temperature of the motor rises, the cover is opened and the mower motor is cooled by cooling air that flows in via the cooling flow path. Thus, the mower motor is prevented from overheating.

PRIOR ART DOCUMENTS

Patent Documents

Patent Document 1: JP H10-164705A
Patent Document 2: JP2012-187026A
Patent Document 3: JP2017-104142A

SUMMARY OF THE INVENTION

Problem to be Solved by the Invention

One objective of the present invention is to provide an electric travelling vehicle that appropriately performs excitation control on an electromagnetic power-off brake according the travel state, and performs brake control under which unnecessary and non-urgent excitation is avoided.

Technology for avoiding an issue in a motor based on the load on the motor and the temperature of the motor is widely known in the field of motor control, and devices and packaged programs for realizing such technology are also commercially available. However, an issue in a power transmission system that transmits power to cutter blades is likely to be overlooked until it is visually or aurally checked. Such an issue in a power transmission system may cause a significant damage.

Another objective of the present invention is to provide a grass mower that can swiftly detect an issue in a power transmission system of a mower unit, instead of an issue in the mower motor.

Means for Solving Problem

An electric travelling vehicle according to one embodiment of the present invention includes: a vehicle body; a power device that includes an electric motor that is driven by being excited, and an electromagnetic power-off brake; a drive wheel configured to be driven by power from the power device; a steering operation part configured to be displaced to a forward travel position, a neutral position, and a rearward travel position from one to another by a manual operation; a motor controller configured to control the electric motor based on displacement of the steering operation part; a brake controller configured to bring the electromagnetic power-off brake into a released state or a braking state; and a travel state detector configured to detect a travelling state that is accompanied with the released state, a stopped state that is accompanied with the braking state, and a transit stopped state that is accompanied with the braking state and is a transit state between the stopped state and the travelling state, wherein a transition from the travelling state to the transit stopped state occurs on a condition that, in the travelling state, the steering operation part has been returned to the neutral position and a predetermined period of time has elapsed upon a rotational speed of the electric motor decreasing to a very low rotational speed, and a transition from the transit stopped state to the stopped state and a transition from the stopped state to the transit stopped state occur upon a manual operation being performed.

In conventional electric travelling vehicles, control is performed in order to selectively create: a travelling state in which an electromagnetic power-off brake (hereinafter abbreviated as an electromagnetic brake, except in specific cases) is excited and brought into a released state and an electric motor is excited so that a vehicle body travels; and a stopped state in which excitation of an electromagnetic clutch is stopped and the electromagnetic clutch is brought into a braking state and excitation of the electric motor is stopped so that the vehicle body is stopped. With the above-described configuration according to the present invention, a control state called a transit stopped state is set between a travelling state and a stopped state. Thus, a transit stopped state occurs before a transition from a travelling state to a stopped state occurs, and the electromagnetic brake and the electric motor are controlled based on individual conditions so that the timing of controlling the electromagnetic brake and the timing of controlling the electric motor can be optimized. For example, in the process of control in which the driver returns the steering operation part to the neutral position to reduce the number of rotations of the electric motor (the vehicle speed) to zero to stop the vehicle body that is travelling, the electromagnetic brake and the electric motor are not simultaneously controlled. Instead, excitation of the electromagnetic brake continues until a predetermined period of time has elapsed upon the rotational speed of the electric motor decreasing to a very low rotational speed (e.g. within the range from 0 rpm to several ten rpm), and excitation of the electromagnetic brake is only stopped upon the predetermined period of time (e.g. approximately 0.5 seconds to 2 seconds) elapsing, so that the electromagnetic brake performs braking. This control is automatically performed, and thus a transition from a travelling state to a transit stopped state is complete. As a result of control automatically being performed on the electric motor and the electromagnetic brake, the vehicle body transitions from a travelling state to a transit stopped state, and the vehicle body is temporarily stopped. In this automatic control performed on the electric motor and the electromagnetic brake to temporarily stop the vehicle body, both power saving and safety are considered in a balanced manner. Also, a transition from this transit stopped state to a stopped state in which the vehicle is reliably stopped occurs on the condition that a manual operation is performed. Therefore, the driver has the intention of fully stopping the vehicle body when bringing the vehicle body into a stopped state.

After the driver returns the steering operation part to the neutral position to reduce the vehicle body speed, and the control state transitions from a travelling state to a transit stopped state, when the driver wishes to set the vehicle body in motion again, the driver operates the steering operation part in a forward travel direction or a rearward travel direction from the neutral position. As a result, the control state transitions from a transit stopped state to a travelling state. Also in this process of control from a transit stopped state to a travelling state, it is preferable that both power saving and safety are considered in a balanced manner when the electromagnetic brake and the electric motor are controlled. For example, in a preferred embodiment of the present invention, a transition from the transit stopped state to the travelling state occurs at least on a condition that, in the transit stopped state, a predetermined period of time (e.g. 0.1 seconds) has elapsed upon the steering operation part being deviated from the neutral position.

A preferred embodiment of the present invention includes a brake operation part of a manual operation type, and the brake operation part is configured to be switchable to a first position to make a request to bring the power-off brake into the released state, and to a second position to make a request to bring the power-off brake into the braking state. Using this brake operation part, the driver can manually bring the electromagnetic brake into a release state or a braking state according to the driver's own will, to stop the vehicle body in an emergency or reliably stop the vehicle body, for example. Furthermore, according to this embodiment, a transition from the transit stopped state to the stopped state occurs at least on a condition that, in the transit stopped state, the brake operation part has been switched to the second position (braking), and a transition from the stopped state to the transit stopped state occurs at least on a condition that, in the stopped state, the brake operation part has been switched to the first position (brake releasing). With the former configuration, the driver can convey an intention to stop the vehicle body to the control system, by operating the brake operation part in such a manner. Considering the driver's intention to stop the vehicle body, the control system brings the vehicle body from the transit stopped state to the stopped state. With the latter configuration, the driver can convey an intention to start running the vehicle body to the control system, by operating the brake operation part in such a manner. Considering the driver's intention to stop the vehicle body, the control system brings the vehicle body from the stopped state to the transit stopped state.

It is possible to perform more appropriate control on the electric motor and the electromagnetic brake by providing various conditions for detecting the travel state. Therefore, according to one preferred embodiment of the present invention, the travel state detector detects the travelling state on a condition that the steering operation part has deviated from the neutral position, the electromagnetic power-off brake is in the released state, the electric motor is in an excited state, and the brake operation part is at the first position. Furthermore, the travel state detector detects the stopped state on a condition that the steering operation part is at the neutral position, the electromagnetic power-off brake is in the braking state, the electric motor is in an unexcited state, and the brake operation part is at the second position. Furthermore, the travel state detector detects the transit stopped state on a condition that the steering operation part is at the neutral position, the electromagnetic power-off brake is in the braking state, the electric motor is in an unexcited state, and the brake operation part is at the first position.

With such a configuration of the present invention, it is possible to prevent the driver from forgetting to operate the brake operation part. In addition, it is possible to save power consumption by automatically stopping excitation of the electromagnetic brake and the travel motor when the vehicle body is temporarily stopped. It is also possible to prevent the electric motor from slightly moving due to a torque loss by activating the electromagnetic brake before activating the electric motor.

The brake operation part of a manual operation type is used by the driver to bring the vehicle body into an emergency stopped state through a braking operation. It is preferable that the above-described transition control is applied to such a transition to an emergency stopped state as well. Therefore, in a preferred embodiment of the present invention, when the brake operation part is switched from the first position to the second position in the travelling state, the power-off brake enters the braking state and a transition from the travelling state to an emergency stopped state in which the vehicle body is stopped occurs when a predetermined period of time (e.g. within the range of 0.1 seconds to 0.5 seconds) has elapsed upon a no-rotation instruction being output to the electric motor. With this configuration, when the vehicle body is travelling, it is possible to sufficiently decelerate the vehicle body before the electromagnetic brake enters the braking state, and thus it is possible to reduce the amount of work involved in braking.

A grass mower according to one embodiment of the present invention includes: a mower unit that includes a rotation shaft to which a cutter blade is attached, a mower motor, and a mower power transmission mechanism that establishes a power transmission path through which power from the mower motor is transmitted to the cutter blade; a mower motor controller configured to control the mower motor; a mower drive state detector configured to detect a drive state of the mower motor; and a mower abnormality detector configured to detect an abnormality in the power transmission path based on a detection signal from the mower drive state detector.

With this configuration, an abnormality in the power transmission path is detected based on a detection signal from the mower drive state detector that detects the drive state of the mower motor. Typically, a motor control system has the function of detecting the drive state of the motor in order to appropriately drive the motor and protect the motor. Examples of the motor drive state to be detected include the number of rotations of the motor, the temperature of the motor, a current flowing through the motor, and load on the motor. If an abnormality occurs in the power transmission path through which power output from the mower motor is transmitted to the cutter blade to rotate the cutter blade, the abnormality also affects the mower motor connected to the power transmission path, which results in a change in the drive state of the motor. The mower abnormality detector detects an abnormality in the power transmission path, i.e. an abnormality in the mower power transmission mechanism, based on such a change in the drive state of the motor. Examples of abnormalities in the power transmission path include disengagement between the rotation shaft and the cutter blade, and disengagement of a belt if the mower power transmission mechanism employs a belt power transmission mechanism.

According to one preferred embodiment of the present invention, the mower motor controller forcibly stops the mower motor upon the mower motor abnormality detector detecting an abnormality. If power is continuously supplied even after an abnormality has occurred in the power transmission path, the abnormality may become more significant or cause a secondary problem. Therefore, it is appropriate to forcibly stop the mower motor to stop power supply.

One preferred embodiment of the present invention includes a manual operation part configured to provide the mower motor controller with a drive instruction that is an instruction to drive the mower motor and a stop instruction that is an instruction to stop the mower motor from driving, and when the mower motor is to be recovered from a forcibly stopped state, the stop instruction and the drive instruction that is subsequent to the stop instruction are required to be provided from the manual operation part. With this configuration, if the mower motor is forcibly stopped while the mower motor is driven according to an instruction provided through an operation performed using the manual operation part, the mower motor will not be recovered from the forcibly stopped state or rotate, unless a stop instruction that is an instruction to stop the mower motor from driving is provided through an operation performed on the manual operation part. Thus, it is possible to avoid an issue such as unexpected rotation of the mower motor during the task of eliminating an abnormality in the power transmission path.

In one preferred embodiment of the present invention, the mower motor is supplied with power via an inverter, the mower drive state detector is a current detector that is built into the inverter and is configured to detect a current value of the mower motor, and the mower abnormality detector detects an abnormality in the mower unit upon the current value falling below a predetermined value while the mower unit is driving. Current detection is essential for motor control performed by an inverter. Therefore, in terms of costs, it is preferable that the mower abnormality detector uses the result of detection received from the current detector built into the inverter. For example, in a case where the current value of the mower motor is more than 100 amperes when the mower motor is performing work under a load, and is approximately one third thereof when the mower motor is under no load, if power transmission is blocked due to disengagement of the power transmission belt or the like, the current value of the mower motor will be several amperes. If the cutter blade and the rotation shaft slip, the current value will be several tens of amperes when the mower motor is performing work, and is approximately one half thereof under no load. Based on such a phenomenon, the mower abnormality detector can detect an issue in the power transmission path.

Based on the specifications of the grass mower, the current value of the mower motor when the mower motor is performing work under a load, the current value (the rated value) of the mower motor under no load, and the current value (or the amount of a drop from the rated value) when a power transmission failure has occurred in the power transmission path for the mower unit can be checked in advance through experiments. Therefore, according to one simple embodiment of the present invention, the mower abnormality detector detects, as an abnormality in the power transmission path, a power transmission failure in the mower power transmission mechanism or an attachment failure in which the cutter blade and the rotation shaft are improperly attached to each other, upon the current value falling below the predetermined value while the mower unit is driving. This configuration is advantageous in terms of costs because an abnormality in the power transmission path can be detected by simply performing a threshold value determination on the current value. Of course, in order to more accurately detect an abnormality in the power transmission path, it is preferable that the mower abnormality detector has the function of detecting an abnormality in the power transmission path based on changes over time in the detection signals from the mower drive state detector, i.e. fluctuations in the detection signals.

Furthermore, the mower abnormality detector may be configured to calculate the probability of occurrence of an abnormality, using a detection signal from the mower drive state detector other than the current detection signal, or various detection signals including the current detection signal, and to detect an abnormality when the probability of occurrence of an abnormality exceeds a predetermined value.

DETAILED DESCRIPTION OF PREFERRED EMBODIMENTS

First Embodiment

The following describes one specific embodiment of an electric travelling vehicle according to the present invention with reference to the drawings. The electric travelling vehicle according to the present embodiment is an electric grass mower. In the present specification, "front" means forward in the front-rear direction (the travel direction) of the vehicle body, and "rear" means rearward in the front-rear direction (the travel direction) of the vehicle body. Also, a left-right direction or a lateral direction means a direction that is orthogonal to the front-rear direction of the vehicle body and is transverse to the machine body (the width direction of the machine body). "Upper" and "lower" indicate a positional relationship in a perpendicular direction (a vertical direction), and show a relationship with respect to a height above ground.

Figure 1:
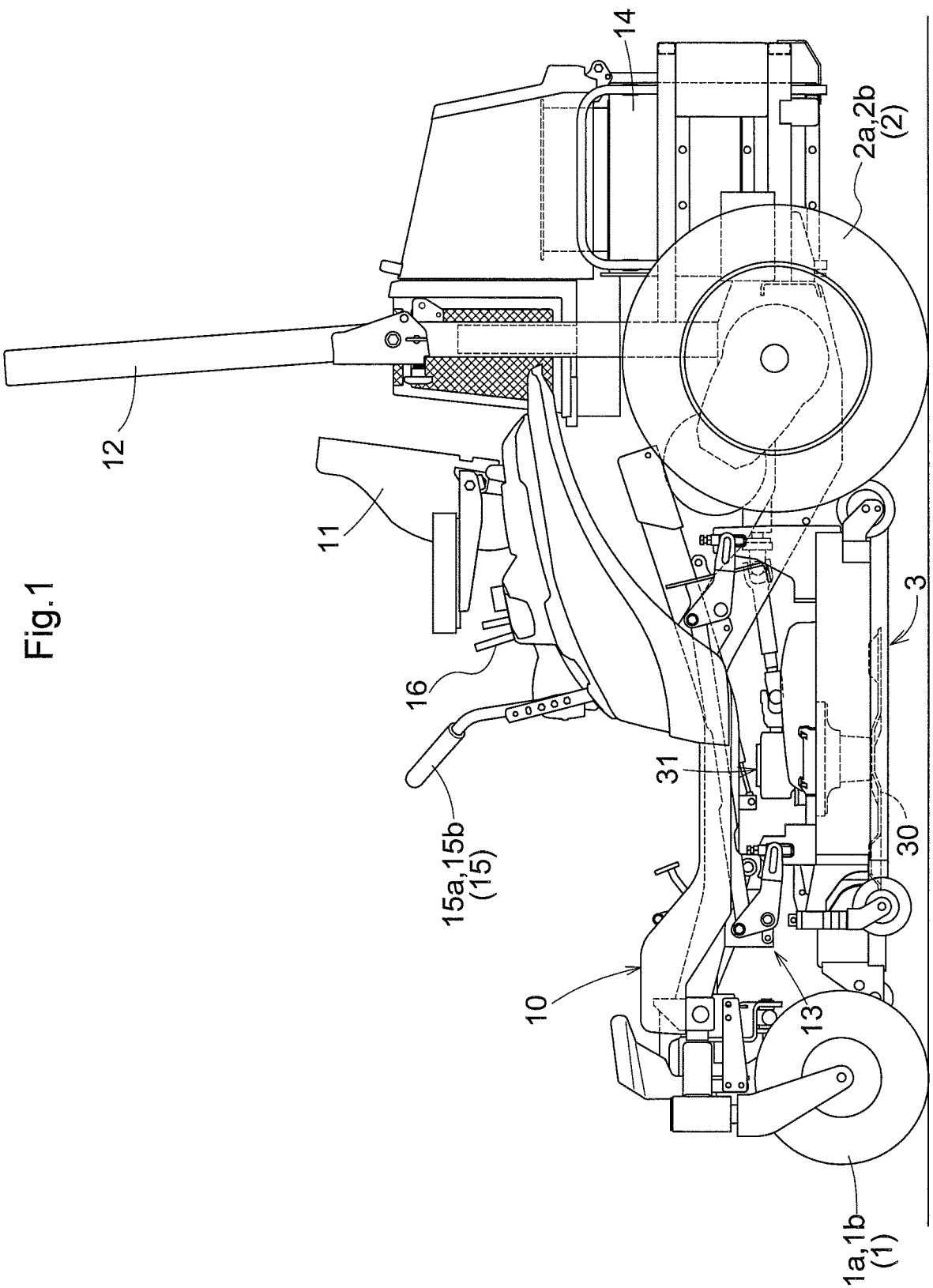
FIG. 1 is a side view of an electric grass mower, which is an example of an electric travelling vehicle according to a first embodiment.
Figure 2:
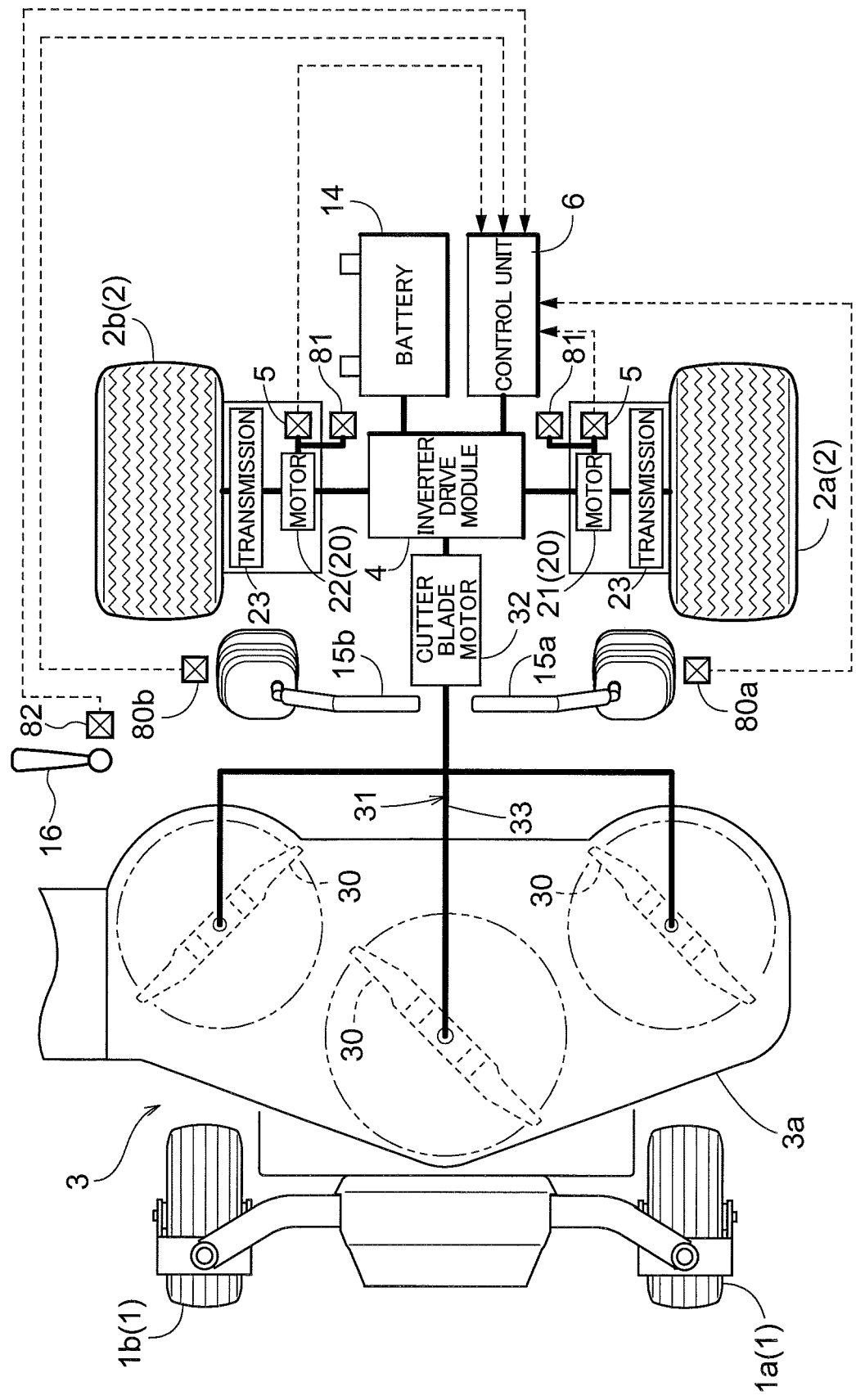
FIG. 2 is a schematic plan view showing a power system and a control system of the electric grass mower.

FIG. 1 is a side view of the electric grass mower, and FIG. 2 is a plan view schematically showing a control system and a power system of the electric grass mower.

This grass mower is provided with: front wheels 1 that include a left front wheel 1a and a right front wheel 1b that are of a caster type and can freely rotate; drive wheels 2 that include a left rear wheel 2a and a right rear wheel 2b; a vehicle body 10 that is supported by the front wheels 1 and the drive wheels 2; a battery 14 that is located in a rear portion of the vehicle body 10; a driver's seat 11 that is located forward of the battery 14; and a rollover protection frame 12 that is located rearward of the driver's seat 11 and stands upright. A mower unit 3 is suspended from the vehicle body 10 in a space below the vehicle body 1, between the front wheels 1 and the drive wheels 2, such that the mower unit 3 can be lifted and lowered by a lifting/lowering linkage mechanism 13.

A floor plate, on which the driver's feet can be placed, is provided forward of the driver's seat 11. Steering operation parts 15 that include a left steering lever 15a and a right steering lever 15b are respectively provided on the left and right sides of the driver's seat 11, each steering lever being swingable about a horizontal swing axis that extends in a direction that transverses the machine body 10. A brake operation part 16 of a manual operation type is provided on the left side of the driver's seat 11.

As shown in FIG. 2, a left motor 21 and a right motor 22, which are electric motors 20 that supply a rotational force to the left rear wheel 2a and the right rear wheel 2b, are provided. The rotational speeds of the left motor 21 and the right motor 22 are individually changed according to the amount of power supplied thereto via an inverter drive module 4. Therefore, the rotational speeds of the left rear wheel 2a and the right rear wheel 2b can be set different from each other, and the grass mower can turn using the difference between the speeds of the left and right rear wheels.

Figure 3:
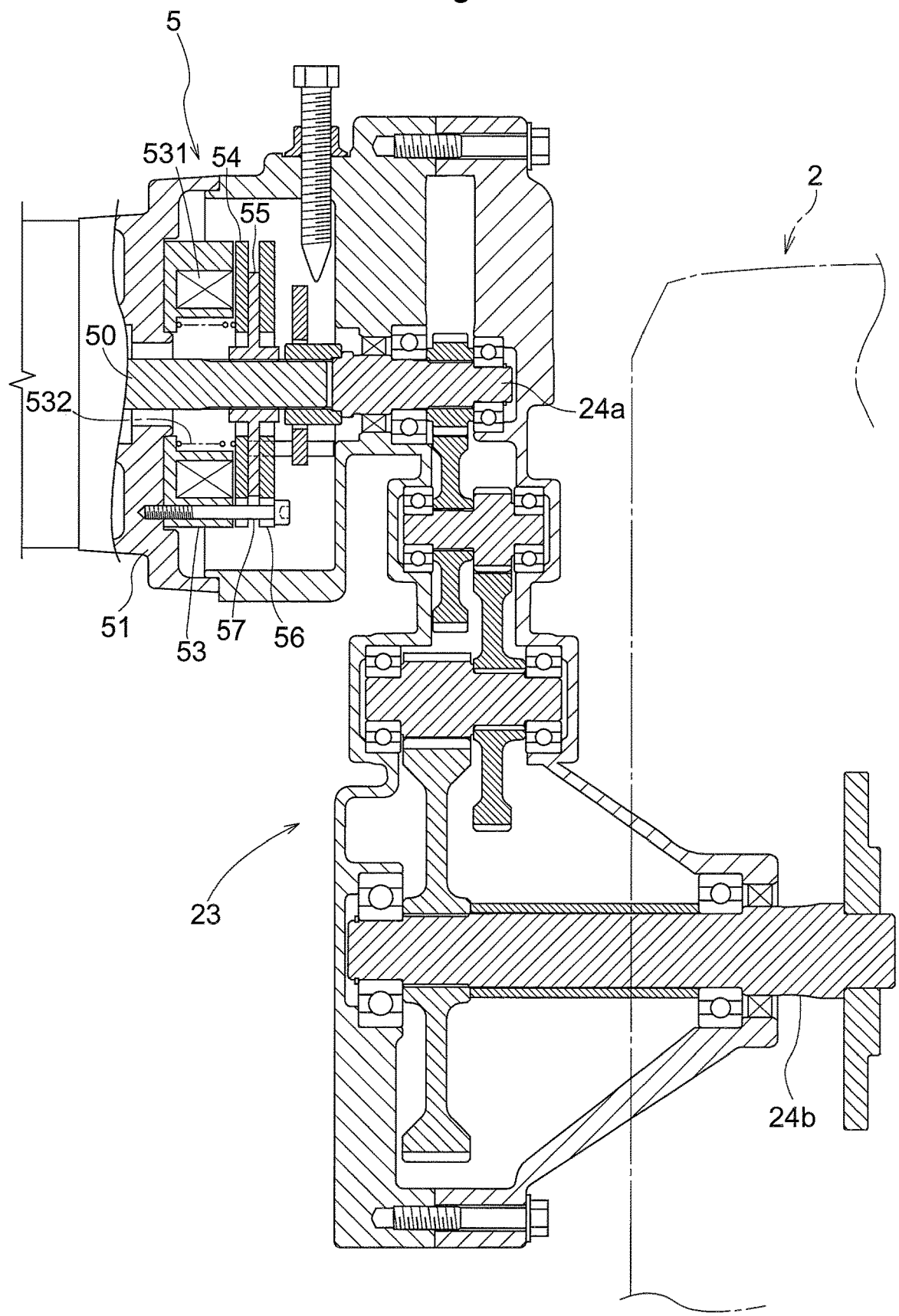
FIG. 3 is a vertical cross-sectional view showing a power transmission mechanism of the electric grass mower.

To transmit power between the electric motors 20 and the drive wheels 2, transmissions 23 for travel are provided. Electromagnetic brakes 5, which are electromagnetic power-off brakes, are interposed between the electric motors 20 and the transmissions 23 to brake power transmission from the electric motors 20 to the transmissions 23. As shown in FIG. 3, in the present embodiment, the output shafts of the electric motors 20 function as rotation shafts 50 of the electromagnetic brakes 5, and the rotation shafts 50 are coupled to input shafts 24a of the transmissions 23. Power input to the input shafts 24a of the transmissions 23 is transmitted to rear axles 24b, which are output shafts of the transmissions 23, via gear power transmission mechanisms. That is, the electric motors 20, the electromagnetic brakes 5, and the transmissions 23 constitute a power device that transmits power to the drive wheels 2. If wheel motors or the like are employed, it is possible to omit the transmissions 23.

Each electromagnetic brake 5 includes a fixed core 53, an armature 54, a holding plate 56, and a brake disk 55. The fixed core 53 is fixed to a brake housing 51, and includes an electromagnetic coil 531 and a brake spring 532 that are arranged coaxially with the rotation shaft 50. The brake disk 55 is a circular disk that has a boss portion that is coupled to the rotation shaft 50 so as not to be rotatable relative to the rotation shaft 50. A friction portion is formed on each side of the brake disk 55. The armature 54 is a ring plate that is disposed coaxially with the rotation shaft 50 and is movable in the axial direction. When the electromagnetic coil 531 is not excited, the armature 54 is pressed against the brake disk 55 due to the biasing spring force of the brake spring 532, and when the electromagnetic coil 531 is excited, the armature 54 is released from the brake disk 55 due to an electromagnetic force that is greater than the biasing spring force.

The holding plate 56 is a ring plate that is disposed coaxially with the rotation shaft 50, and is fixed to the fixed core 53 by coupling rods 57 that are distributed at three positions in a circumferential direction. The coupling rods 57 also function as guide rods for the armature 54 that moves in the axial direction, and as rods for preventing the armature 54 from rotating. Therefore, the coupling rods 57 are fitted into recesses that are provided in the outer periphery of the armature 54.

As shown in FIG. 2, the mower unit 3 is of a side discharge type provided with three cutter blades (blades), and includes a mower deck 3a and three rotary cutter blades 30. A blade drive mechanism 31 that rotates the cutter blades 30 includes a cutter blade motor 32, which is an electric actuator, and a cutter blade power transmission mechanism 33 that transmits power from the cutter blade motor 32 to the cutter blades 30. The cutter blade motor 32 is also supplied with power by the inverter drive module 4.

Grass that has been cut by the cutter blades 30 as a result of the grass mower travelling while rotating the cutter blades 30 is transported by wind generated by wind stirring blades of the cutter blades 30 and baffle plates, to a lateral end side on which a discharge port is located, through the inside of the mower deck 3a, and is discharged from the discharge port located on the lateral end side, laterally outward of the mower deck 3a.

As shown in FIG. 2, a control unit 6 excites the electric motors 20, the cutter blade motor 32, and the electromagnetic brakes 5 based on detection signals from sensors and switches. Therefore, a left steering position detection sensor 80a that detects a swing position (a forward travel position, a neutral position, or a rearward travel position) of the left steering lever 15a, a right steering position detection sensor 80b that detects a swing position (a forward travel position, a neutral position, or a rearward travel position) of the right steering lever 15b, rotation sensors 81 that respectively detect rotations of the left motor 21 and the right motor 22, a brake sensor 82 that detects an operation position of the brake operation part 16, and so on are provided.

The control unit 6 is connected to the left steering position detection sensor 80a, the right steering position detection sensor 80b, the rotation sensors 81, the brake sensor 82, and so on. The control unit 6 supplies brake excitation currents, which excite the electromagnetic brakes 5, to the electromagnetic brakes 5 via a driver (not shown).

The inverter drive module 4 outputs drive currents respectively to the left motor 21, the right motor 22, and the cutter blade motor 32 to excite and rotate them, based on control target signals from the control unit 6.

Next, control functional units related to the electric motors 20, the electromagnetic brakes 5, and the brake operation part 16 will be described with reference to the functional blocks shown in FIG. 4. The control unit 6 includes a motor controller 61, a brake controller 62, and a travel state detector 63.

The motor controller 61 generates target control signals for controlling the left motor 21 and the right motor 22, based on detection signals from the left steering position detection sensor 80a and the right steering position detection sensor 80b that respectively detect displacement of the left steering lever 15a and displacement of the right steering lever 15b. Furthermore, the motor controller 61 generates a target control signal for controlling the cutter blade motor 32. Target control signals are supplied to the inverter drive module 4. The inverter drive module 4 includes an inverter drive signal generator 41 and an inverter circuit 42. The inverter drive signal generator 41 generates inverter drive signals based on the target control signals. The inverter circuit 42 generates motor excitation currents (drive currents) that are supplied to the left motor 21, the right motor 22, and the cutter blade motor 32, based on the inverter drive signals.

The brake controller 62 controls excitation currents to bring the electromagnetic brakes 5 into a released state (excited) or a braking state (not excited). The brake operation part 16 is switchable to a first position (releasing) to make a request to bring the electromagnetic brakes 5 into a released state, and to a second position (braking) to make a request to bring the electromagnetic brakes 5 into a braking state. The brake operation part 16 at the first position or the second position is detected by the brake sensor 82, and a detection signal thus generated is transmitted to the control unit 6.

The travel state detector 63 detects various control states such as a travelling state, a transit stopped state, a stopped state, and emergency stopped states (an emergency stopped state A and an emergency stopped state B have been set in the present embodiment) of the vehicle body 10. A transit stopped state is a state between a stopped state and a travelling state. When transitioning from a stopped state to a travelling state and when transitioning from a travelling state to a stopped state, the vehicle body 10 necessarily undergoes a transit stopped state.

Figure 5:
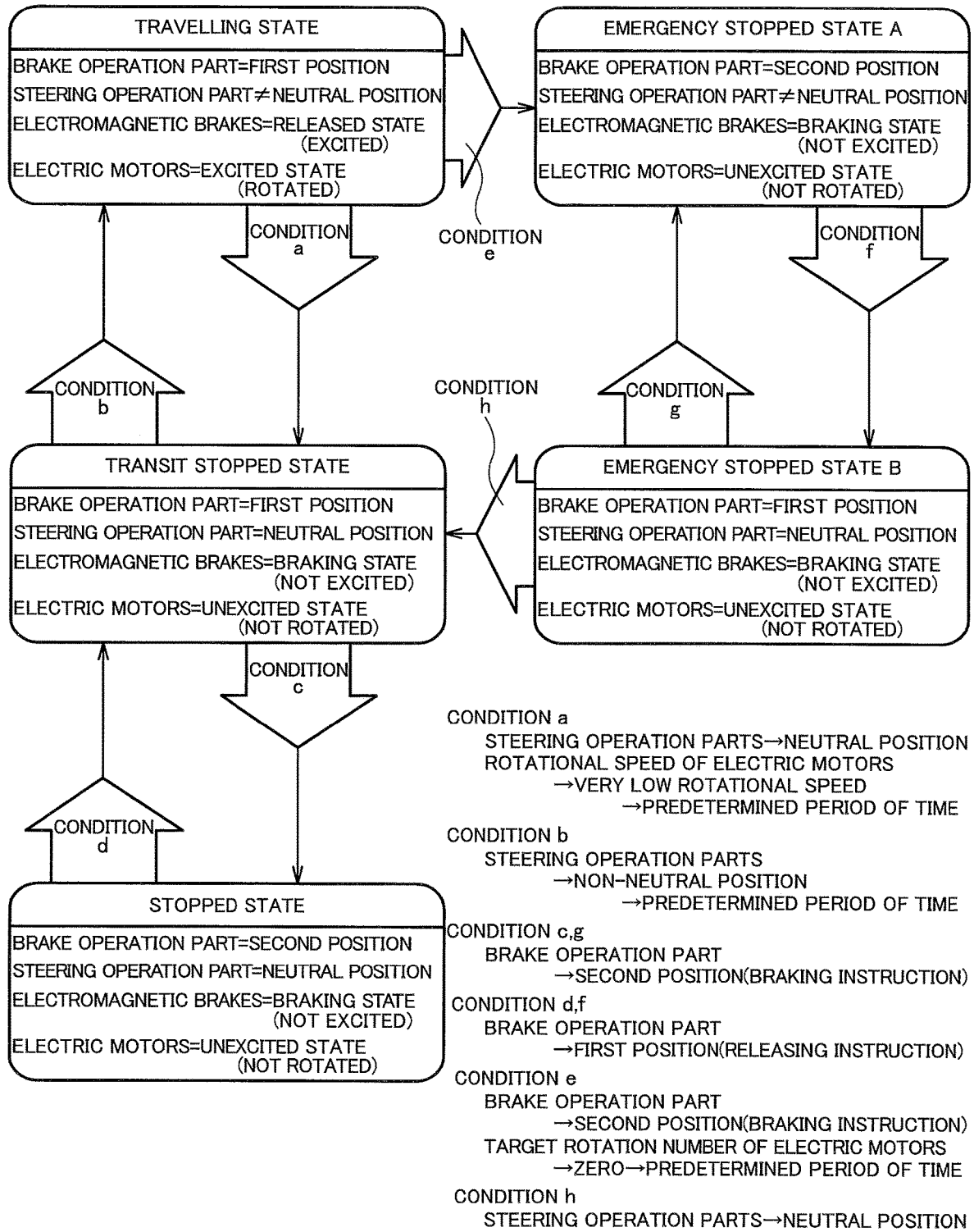
FIG. 5 is a schematic diagram showing transitions between control states of the control system.

When specific conditions are satisfied in each of the control states detected by the travel state detector 63, the control unit 6 controls transition to another control state. Next, transition to each of the control states, which, in the present embodiment, occurs when specific conditions are satisfied, will be described with reference to FIG. 5.

First, the control states in the present embodiment are defined as follows.

(1) Travelling State

The brake operation part 16 is at the first position (releasing), the steering operation parts 15 have deviated from the neutral positions, the electromagnetic brakes 5 are in a released state (excited), and the electric motors 20 are in an excited state (rotated).

(2) Transit Stopped State

The brake operation part 16 is at the first position, the steering operation parts 15 are at the neutral positions, the electromagnetic brakes 5 are in a braking state (not excited), and the electric motors 20 are in an unexcited state (not rotated).

(3) Stopped State

The brake operation part 16 is at the second position (braking), the steering operation parts 15 are at the neutral positions, the electromagnetic brakes 5 are in a braking state (not excited), and the electric motors 20 are in an unexcited state (not rotated).

(4) Emergency Stopped State A

The brake operation part 16 is at the second position, the steering operation parts 15 have deviated from the neutral positions, the electromagnetic brakes 5 are in a braking state (not excited), and the electric motors 20 are in an unexcited state (not rotated).

(5) Emergency Stopped State B

The brake operation part 16 is at the first position, the steering operation parts 15 are at the neutral positions, the electromagnetic brakes 5 are in a braking state (not excited), and the electric motors 20 are in an unexcited state (not rotated). This state functions as a transit state for returning to a normal travelling or stopped state from an emergency stopped state A.

Conditions for a transition from each state to a specified state are as follows.

(A) Travelling State to Transit Stopped State

A condition that, in the travelling state, the steering operation parts 15 have been returned to the neutral positions (in the present embodiment, each of the left steering lever 15a and the right steering lever 15b may be located within the range of plus or minus 1% from the neutral position thereof), and a predetermined period of time has elapsed upon the rotational speed of each of the electric motors 20 decreasing to a very low rotational speed <Condition a>. The very low rotational speed is, for example, no greater than 10 rpm, and may be positive, negative, or zero. The predetermined period of time is, for example, one second. Upon <Condition a> being satisfied, excitation of the electromagnetic brakes 5 is stopped, and the electromagnetic brakes 5 enter a braking state.

(B) Transit Stopped State to Travelling State

A condition that, in the transit stopped state, a predetermined period of time has elapsed upon at least one of the steering operation parts 15 deviating from the neutral position thereof <Condition b>. This predetermined period of time is, for example, 100 milliseconds. Upon <Condition b> being satisfied, excitation of the electromagnetic brakes 5 is started, and the electromagnetic brakes 5 enter a released state.

(C) Transit Stopped State to Stopped State

A condition that, in the transit stopped state, the brake operation part 16 has been switched to the second position <Condition c>. If <Condition c> is satisfied, it means that a braking instruction that is an instruction to bring the electromagnetic brakes 5 into a braking state is provided to the brake controller 62 via the brake sensor 82.

(D) Stopped State to Transit Stopped State

A condition that, in the stopped state, the brake operation part 16 has been switched to the first position <Condition d>. If <Condition d> is satisfied, it means that a releasing instruction that is an instruction to bring the electromagnetic brakes 5 into a released state is provided to the brake controller 62 via the brake sensor 82. That is, this condition is satisfied at a stage before the electromagnetic brakes 5 are brought into a released state.

(E) Travelling State to Emergency Stopped State A

A condition that, in the travelling state, the brake operation part 16 has been switched to the second position, and a predetermined period of time has elapsed upon the number of rotations of the electric motors 20 decreasing to zero as a result of the motor controller 61 outputting a no-rotation instruction to the electric motors 20 <Condition e>. This predetermined period of time is, for example, 200 milliseconds. Upon <Condition e> being satisfied, excitation of the electromagnetic brakes 5 is stopped, and the electromagnetic brakes 5 enter a braking state.

(F) Emergency Stopped State A to Emergency Stopped State B

A condition that, in the stopped state, the brake operation part 16 has been switched to the first position <Condition f>. If <Condition f> is satisfied, it means that a releasing instruction that is an instruction to bring the electromagnetic brakes 5 into a released state is provided to the brake controller 62 via the brake sensor 82. That is, this condition is satisfied at a preparatory stage for recovering the travelling state after the transit stopped state. The electromagnetic brakes 5 are still in a braking state.

(G) Emergency Stopped State B to Emergency Stopped State A

A condition that, in the emergency stopped state A, the brake operation part 16 has been switched to the second position <Condition g>. If <Condition g> is satisfied, it means that a braking instruction that is an instruction to bring the electromagnetic brakes 5 into a braking state is provided to the brake controller 62 via the brake sensor 82.

(H) Emergency Stopped State B to Transit Stopped State

A condition that, in the emergency stopped state B, the steering operation parts 15 are returned to the neutral positions <Condition h>. If <Condition h> is satisfied, it means that preparations for returning to the travelling state have been made.

As described above, not only simple control states such as a travelling state, a stopped state, and emergency stopped states, but also a transit stopped state is set between a travelling state and a stopped state, and thus control over the electromagnetic brakes 5 and the electric motors 20 is optimized. Also, the emergency stopped state A and the emergency stopped state B are set as the emergency stopped states, and thus control over a transition from an emergency stopped state to a normal travelling state and a normal stopped state is optimized.

Other Embodiments Modified from First Embodiment (1) In the above-described embodiment, the left motor 21 that drives the left rear wheel 2a and the right motor 22 that drives the right rear wheel 2b are provided as the electric motors 20. Instead of this configuration, the electric motors 20 may be replaced with a single motor, and the output line from the motor may be divided into left and right lines, and transmissions 23 that each have a continuously variable transmission device may be provided on the left and right lines, respectively. With this configuration, steering is realized by adjusting the respective shift positions of the continuously variable transmission devices using the left steering lever 15a and the right steering lever 15b.

(2) The brake operation part 16 may be provided with a lever switch or a seesaw switch that can be selectively set to the first position and the second position, or a momentary action type switch or an alternating action type switch instead.

(3) According to the above-described embodiment, the electric travelling vehicle is a so-called zero-turn type vehicle in which the left rear wheel 2a and the right rear wheel 2b constituting the drive wheels 2 can be individually driven. However, the electric travelling vehicle may be a vehicle in which the left rear wheel 2a and the right rear wheel 2b are coupled to each other by a differential mechanism. If this is the case, the electric motors 20 are replaced with a single motor. In this case, typically, a steering wheel is used as the steering operation parts 15.

Figure 4:
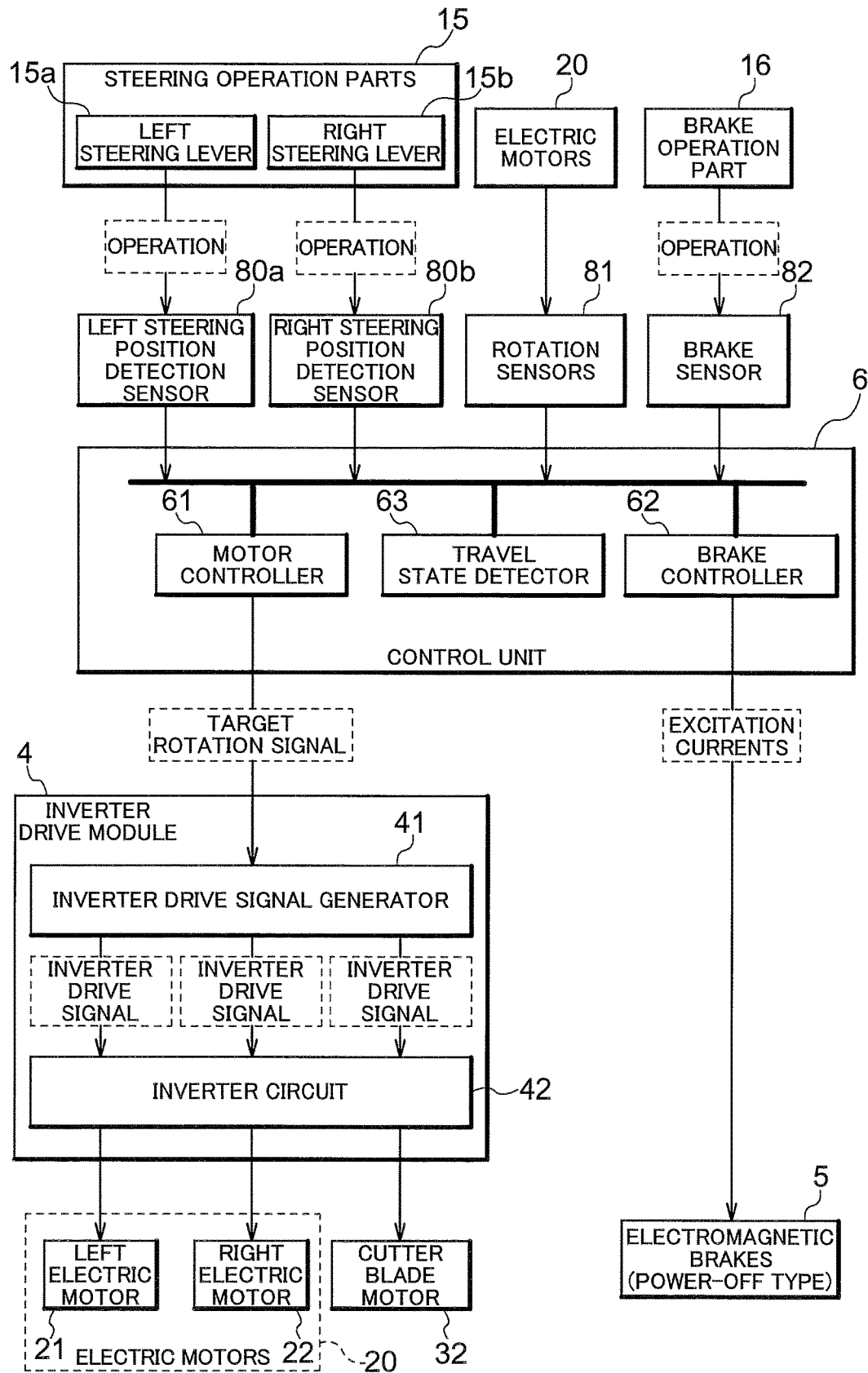
FIG. 4 is a functional block diagram showing the control system of the electric grass mower.

(4) The way in which the functional units shown in the functional block diagrams in FIGS. 3 and 4 are distinguished from each other is an example for facilitating understanding of the descriptions. Several functional units may be integrated into one, and a single functional unit may be divided into a plurality of units, as appropriate.

(5) In the above-described embodiment, the electric travelling vehicle is a grass mower. However, the electric travelling vehicle may be an agricultural work machine such as a tractor, a combine, or a rice transplanter. Furthermore, the present invention is applicable to an off-road vehicle such as a Jeep.

Second Embodiment

The following describes one specific embodiment of a grass mower according to the present invention with reference to the drawings. The grass mower according to the present embodiment is a mid-mount type electric grass mower.

Figure 6:
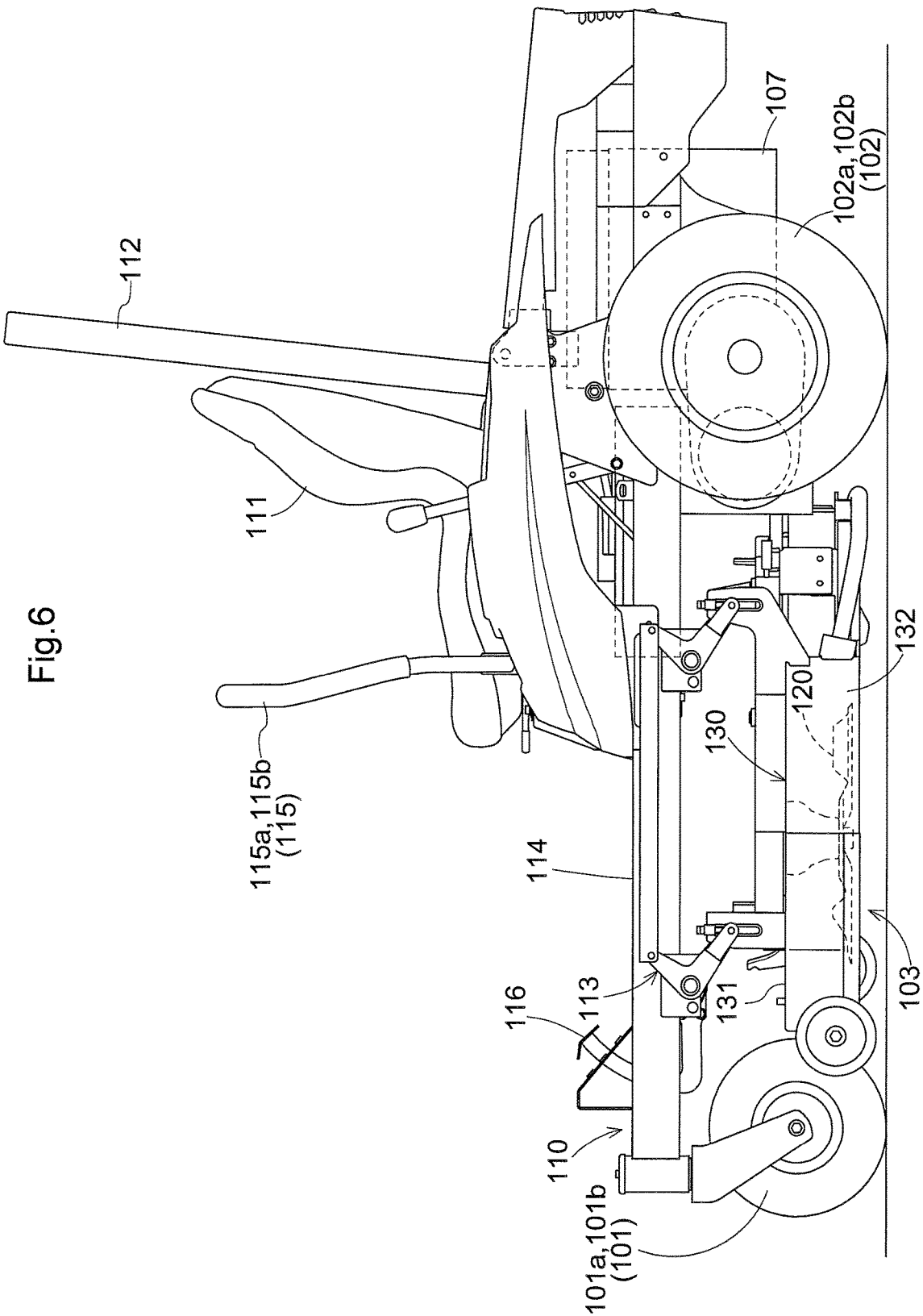
FIG. 6 is a side view of a mid-mount passenger electric grass mower provided with a mower unit according to a second embodiment.

FIG. 6 is a side view of the electric grass mower (hereinafter simply referred to as the grass mower). This grass mower is provided with: a front wheel unit 101 that includes a left front wheel 101a and a right front wheel 101b that are of a caster type and can freely rotate; a drive wheel unit 102 that includes a left rear wheel 102a and a right rear wheel 102b; a vehicle body frame 110 that is supported by the front wheel unit 101 and the drive wheel unit 102; a battery 107 that is located in a rear portion of the vehicle body frame 110; a driver's seat 111 that is located forward of the battery 107; a rollover protection frame 112 that is located rearward of the driver's seat 111 and stands upright; and a mower unit 103 that is suspended from the vehicle body frame 110 in a space below the vehicle body frame 110, between the front wheel unit 101 and the drive wheel unit 102, such that the mower unit 103 can be lifted and lowered by a lifting/lowering linkage mechanism 113.

A floor plate 114, on which the driver's feet can be placed, is provided forward of the driver's seat 111, and a brake pedal 116 protrudes therefrom. Steering units 115 that include a left steering lever 115a and a right steering lever 115b are respectively provided on the left and right sides of the driver's seat 111, each steering lever being swingable about a horizontal swing axis that extends in a direction that transverses the machine body. The rotational speed of the left rear wheel 102a can be changed using the left steering lever 115a, and the rotational speed of the right front wheel 101b can be changed using the right steering lever 115b. The rotational speeds of the left rear wheel 102a and the right rear wheel 102b can be individually changed, and a sharp turn can be realized by setting the directions of rotation of the rear wheels to be opposite to each other. Therefore, this grass mower is also referred to as a zero-turn mower.

Figure 7:
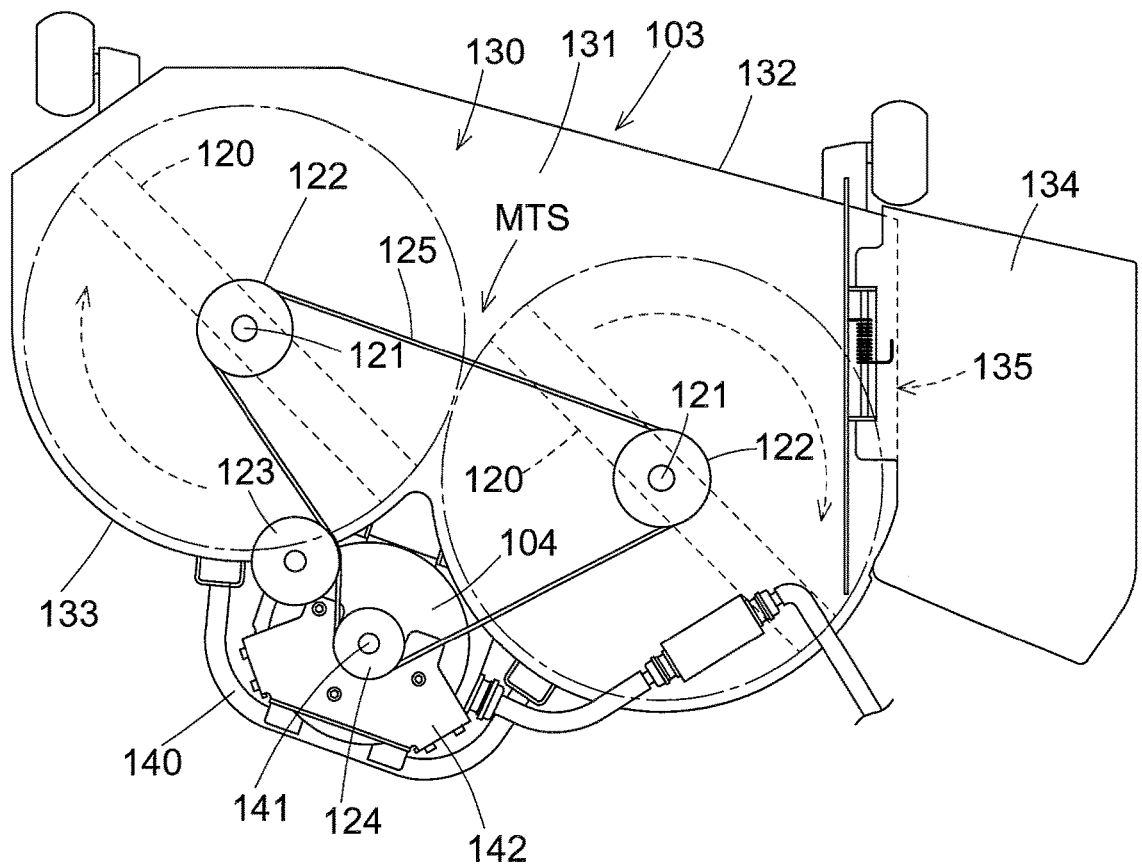
FIG. 7 is a plan view of the mower unit.

As shown in FIG. 7, the mower unit 103 is of a side discharge type, and is provided with a mower deck 130 and two rotary cutter blades 120. The left cutter blade 120 and the right cutter blade 120 are arranged side by side in a direction that traverses the vehicle body. The mower deck 130 includes a top wall 131, and a front wall 132 and a rear wall 133 that extend downward from the outer peripheral edge of the top wall 131. The front wall 132 is continuous with a front portion of the outer peripheral edge of the top wall 131, and the rear wall 133 is continuous with a rear portion of the outer peripheral edge. Right end areas of the front wall 132 and the rear wall 133 are cut out so as to form a cut grass discharge port 135, which is covered by a cover 134. The cutter blades 120 are located in an internal space of the mower deck 130, which is defined by the top wall 131, the front wall 132, and the rear wall 133.

Each cutter blade 120 has a band plate-like shape with cutting edges at both ends thereof. Also, wind stirring blades are formed on the back side of the cutting edges. During grass cutting work, grass that has been cut by the cutter blades 120 as a result of the grass mower travelling while rotating the cutter blades 120 is transported through the inside of the mower deck 130 by wind generated by the wind stirring blades of the cutter blades 120, while being guided by baffle plates located in the mower deck 130, and is discharged laterally outward of the mower deck 130 from the grass discharge port 135.

Figure 8:
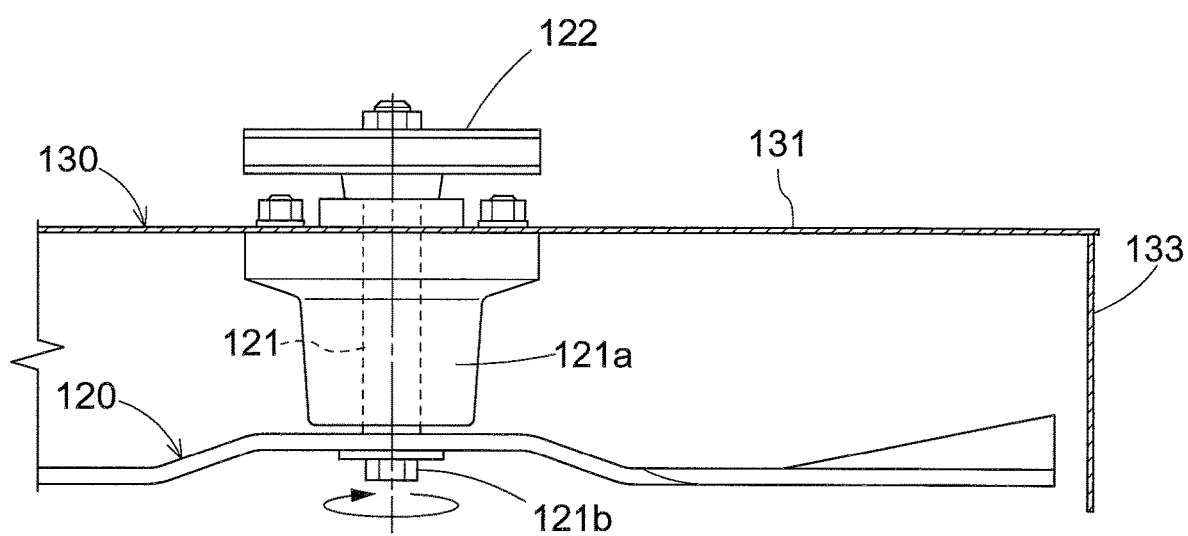
FIG. 8 is a vertical cross-sectional view of the mower unit.

As shown in FIG. 8, rotation shafts 121 that extend downward penetrating through the top wall 131 of the mower deck 130 are held by the top wall 131 so as to be rotatable, using bearing units 121a. The cutter blades 120 are fastened and fixed to the lower ends of the rotation shafts 121 so as to be replaceable, using attachment bolts 121b. Input pulleys 122 are attached to the upper ends of the rotation shafts 121.

As shown in FIG. 7, a mower motor 104 that supplies power to the cutter blades 120 is mounted on a mounting platform 140 that protrudes rearward from the rear wall 133. An output shaft 141 of the mower motor 104 is held in a vertical orientation inside a motor housing 142 so as to be rotatable, using a bearing, and the upper end of the output shaft 141 juts out of the motor housing 142. An output pulley 124 is attached to this jutting portion of the output shaft 141.

A belt 125 is hooked around the input pulleys 122 attached to the two rotation shafts 121, the output pulley 124 attached to the output shaft 141 of the mower motor 104, and a tension pulley unit 123 attached to the mower deck 130. That is, in the present embodiment, a mower power transmission mechanism MTS that establishes a power transmission path for transmitting power from the mower motor 104 to the cutter blades 120 is constituted by the output pulley 124 attached to the output shaft 141 of the mower motor 104, the belt 125, the tension pulley unit 123, the input pulleys 122, and the rotation shafts 121 to which the cutter blades 120 are fastened and fixed. If the belt 125 comes off from the input pulleys 122, the output pulley 124, or the tension pulley unit 123, the belt 125 slips, or the cutter blades 120 fastened and fixed to the rotation shafts 121 come loose, power transmission is at least partially blocked, and an abnormality occurs in the power transmission path.

Figure 9:
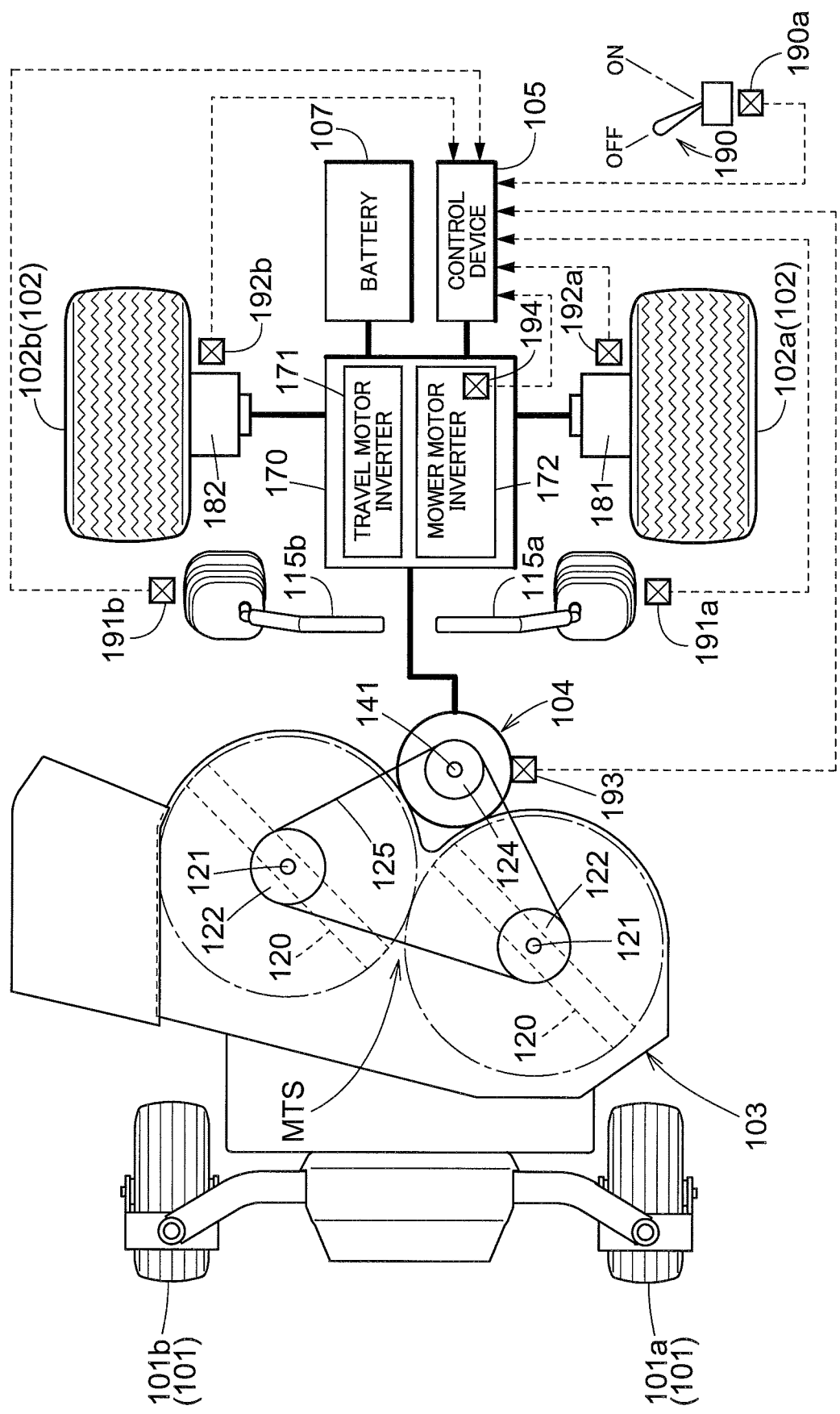
FIG. 9 is a schematic diagram showing a power system and a control system of the electric grass mower.

FIG. 9 shows a power system and a control system of the electric grass mower. A left motor 181 and a right motor 182, which are travel motors that respectively rotate the left rear wheel 102a and the right rear wheel 102b, and the mower motor 104, which rotates the cutter blades 120, are supplied with power from an inverter 170. The inverter 170 includes a travel motor inverter 171 that supplies power to the left motor 181 and the right motor 182, and a mower motor inverter 172 that supplies power to the mower motor 104. The inverter 170 drives are based on a control signal from a control device 105. The inverter 170 is connected to the battery 107, which is a power source.

A mower operation part 190, a left steering angle detection sensor 191a, a right steering angle detection sensor 191b, a left motor rotation detection sensor 192a, a right motor rotation detection sensor 192b, a mower motor rotation detection sensor 193, and a current detector 194 are connected to the control device 105.

The mower operation part 190 is a manual operation part that is used to drive the mower motor 104 or stop the mower motor 104 from driving, selectively. In the present embodiment, the mower operation part 190 is configured as a swing lever that is swingable to a first position (ON) and a second position (OFF). Upon the mower operation part 190 being operated to swing to the first position, an operation position detection sensor 190a provides the control device 105 with a drive instruction, which is an instruction to drive the mower motor 104. Upon the mower operation part 190 being operated to swing to the second position, the operation position detection sensor 190a provides the control device 105 with a stop instruction, which is an instruction to stop the mower motor 104 from driving.

The left steering angle detection sensor 191a detects the swing angle of the left steering lever 115a. The right steering angle detection sensor 191b detects the swing angle of the right steering lever 115b. The left motor rotation detection sensor 192a detects the number of rotations of the left motor 181. The right motor rotation detection sensor 192b detects the number of rotations of the right motor 182. The mower motor rotation detection sensor 193 detects the number of rotations of the mower motor 104.

The current detector 194, which is built into the mower motor inverter 172, detects a current flowing through the mower motor 104.

Figure 10:
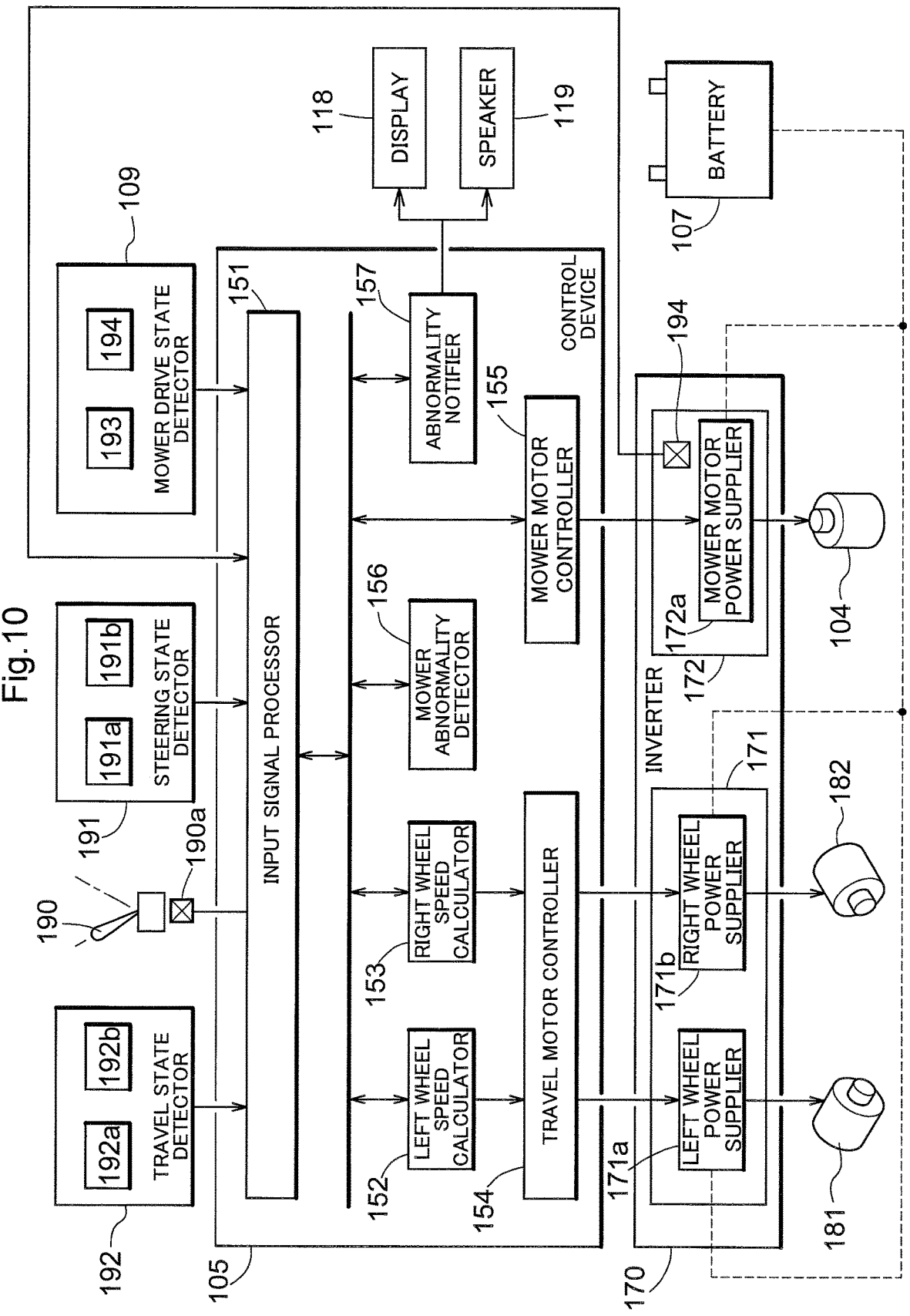
FIG. 10 is a functional block diagram showing the control system.

As shown in FIG. 10, the control device 105 receives detection signals input from a mower drive state detector 109, a steering state detector 191, and a travel state detector 192. The mower drive state detector 109 includes the mower motor rotation detection sensor 193, the current detector 194, and so on. The steering state detector 191 includes the left steering angle detection sensor 191a and the right steering angle detection sensor 191b. The travel state detector 192 includes the left motor rotation detection sensor 192a and the right motor rotation detection sensor 192b.

The control device 105 includes functional units such as an input signal processor 151, a left wheel speed calculator 152, a right wheel speed calculator 153, a travel motor controller 154, a mower motor controller 155, a mower abnormality detector 156, and an abnormality notifier 157, and these functional units are built as pieces of hardware or software. The input signal processor 151 has a sensor information processing function and an operational input processing function. The input signal processor 151 processes external signals from the travel state detector 192, the steering state detector 191, the mower drive state detector 109, and so on, and converts the signals to pieces of information that can be internally used by the control device 105.

The left wheel speed calculator 152 obtains the rotational speed (the number of rotations) of the left rear wheel 102a, i.e. the rotational speed (the number of rotations) of the left motor 181, based on operational information received via the left steering angle detection sensor 191a, which detects the amount of movement of the left steering lever 115a operated by the driver. Similarly, the right wheel speed calculator 153 obtains the rotational speed (the number of rotations) of the right rear wheel 102b, i.e. the rotational speed (the number of rotations) of the right motor 182, based on operational information received via the right steering angle detection sensor 191b, which detects the amount of movement of the right steering lever 115b operated by the driver.

The travel motor controller 154 provides the travel motor inverter 171 with control signals for supplying the left motor 181 and the right motor 182 with power that is required to achieve the rotational speed of the left motor 181 and the rotational speed of the right motor 182 obtained by the left wheel speed calculator 152 and the right wheel speed calculator 153. The travel motor inverter 171 includes a left wheel power supplier 171a and a right wheel power supplier 171b. The rotational speeds of the left motor 181 and the right motor 182 change according to the amount of power individually supplied thereto by the left wheel power supplier 171a and the right wheel power supplier 171b. Therefore, the rotational speeds of the left rear wheel 102a and the right rear wheel 102b can be set different from each other, and the grass mower can turn due to the difference between the speeds of the left and right rear wheels.

Upon the mower operation part 190 being switched to the first position (ON) and the operation position detection sensor 190a providing the control device 105 with a first position detection signal, which is a drive instruction and is an instruction to drive the mower motor 104, the mower motor controller 155 controls a mower motor power supplier 172a of the mower motor inverter 172 to drive the mower motor 104.

In the present embodiment, the mower abnormality detector 156 detects an abnormality that has occurred in the power transmission path established by the mower power transmission mechanism MTS, based on a detection signal from the current detector 194, which is one of the components of the mower drive state detector 109. Furthermore, upon the mower abnormality detector 156 detecting an abnormality that has occurred in the power transmission path, the mower motor 104 is forcibly stopped even if a drive instruction has been input using the mower operation part 190. Note that, in order to recover the mower motor 104 from a forcibly stopped state, a recovery operation needs to be performed using the mower operation part 190. Specifically, the mower operation part 190 is first returned from the second position to the first position and an instruction to stop the mower motor 104 is input to the control device 105, and thereafter the mower operation part 190 is switched from the second position to the first position and a drive instruction is input to the control device 105. Thus, the mower motor 104 starts driving again.

One specific abnormality detection method that can be employed by the mower abnormality detector 156 is to check the current value of the mower motor power supplier 172a, detected by the current detector 194 while the mower unit 103 is driving (while the cutter blades 120 are rotating). A current value under a no load condition or a normal load condition can be used as a reference value, and a value that is lower than this reference value by a predetermined amount can be used as an abnormality detection threshold value. In this case, if the current value falls below the predetermined value (the abnormality detection threshold value) despite the mower unit 103 being driven, the mower abnormality detector 156 can determine that an abnormality has occurred in the power transmission path from the mower motor 104 to the cutter blades 120. In this regard, in order to prevent a sudden drop in the current value, which may be caused by a disturbance or the like, from being associated with the occurrence of an abnormality, it is preferable that an average of current values that have been measured over a period of time is used as a value that is to be compared with the abnormality detection threshold value.

The abnormality notifier 157 notifies the driver of the occurrence of an abnormality when the mower abnormality detector 156 detects an abnormality in the power transmission path, using a display 118 or a speaker 119 or both. If the mower abnormality detector 156 can discern between various types of abnormalities, e.g. between a power transmission failure in the mower power transmission mechanism MT such as disengagement of the belt and an attachment failure in which the cutter blades 120 and the rotation shafts 121 are improperly attached, based on the amount of a drop from the reference current value, it is preferable that the driver is notified of an abnormality such that the driver can discern the type of abnormality.

Figure 11:
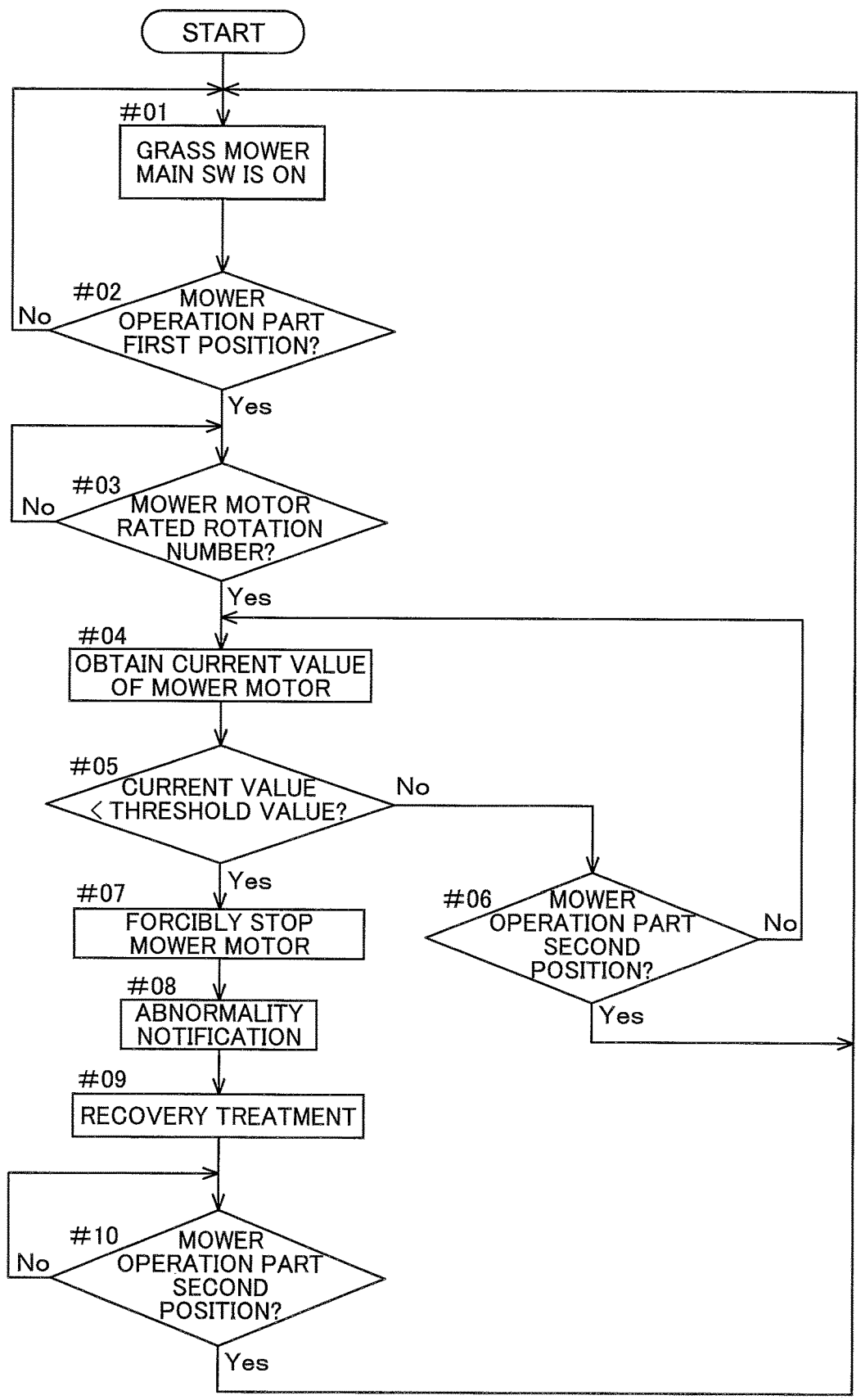
FIG. 11 is a flowchart showing an example of abnormality detection.

Next, the following describes an example of a flow of control for detecting an abnormality in the power transmission path in the grass mower, with reference to the flowchart shown in FIG. 11.

This flowchart starts from a point in time when the grass mower is in a work standby state (#01). When the grass mower is in a work standby state, a main SW is ON and the mower operation part 190 is at the second position. To transition from a work standby state to a working state, the grass mower first requires that the mower operation part 190 is switched to the first position (#02). Upon the mower operation part 190 being switched to the first position (#02: "Yes" branch), the mower motor 104 starts rotating. The grass mower stands by until the number of rotations of the mower motor 104, which has started rotating, reaches a rated number of rotations (#03: "No" branch). Although not shown in this flowchart, if the mower motor 104 does not reach the rated number of rotations within a predetermined period of time, the mower motor 104 is forcibly stopped. At this time, if the travel motors are driving, the travel motors are also forcibly stopped. If the mower motor 104 reaches the rated number of rotations within the predetermined period of time (#03: "Yes" branch), the current value of the mower motor 104 is obtained (#04). The current value thus obtained is compared with an abnormality detection threshold value that has been set in advance (#05). If the current value is no less than the abnormality detection threshold value (#05: "No" branch), it is determined that there is no abnormality, and furthermore, whether or not the mower operation part 190 has been switched to the second position is checked (#06). If the mower operation part 190 has been switched to the second position (#06: "Yes" branch), it means that mowing work has been suspended. Therefore, processing returns to step #01 and the grass mower enters a work standby state. If the mower operation part 190 has not been switched to the second position, i.e. if the mower operation part 190 is still at the first position (#06: "No" branch), mowing work continues, and processing returns to step #04 so that the current value of the mower motor 104 is obtained again.

At determination in step #05, if the current value is less than the abnormality detection threshold value, it is determined that there is an abnormality (#05: "Yes" branch), and the mower motor 104 is forcibly stopped (#07). At the same time, the abnormality notifier 157 performs abnormality notification (#08). Subsequently, recovery treatment is performed to address the abnormality (#09). For example, if the abnormality is disengagement of the belt 125, the belt 125 is re-attached. To return to mowing work after recovery treatment has been completed, the grass mower first requires that whether or not the mower operation part 190 has been switched to the second position is checked (#10). If the mower operation part 190 has been switched to the second position (#10: "Yes" branch), the forcibly stopped state is cancelled, and processing returns to step #01 so that the grass mower enters a work standby state. In step #10, if the mower operation part 190 is still at the first position (#10: "No" branch), the forcibly stopped state is not cancelled, and the cutter blades 120 do not start rotating.

Other Embodiments Modified from Second Embodiment (1) The mower abnormality detector 156 may be configured to detect an abnormality using a detection signal from the mower drive state detector 109 other than a current detection signal (such as a rotation detection signal or a load detection signal). Alternatively, the mower abnormality detector 156 may be configured to receive a plurality of input detection signals including a current detection signal, calculate the probability of occurrence of an abnormality using a calculation module that employs machine learning or the like, and detect an abnormality when the probability of occurrence of an abnormality exceeds a predetermined value.

(2) In the above-described embodiment, power from a single mower motor 104 is distributed to the two cutter blades 120 by a belt power transmission mechanism. Instead, the mower motor 104 may be provided for each of the cutter blades 120. If this is the case, the mower power transmission mechanism MTS is the rotation shafts 121 that transmit power from output shafts 141 of the mower motors 104 to the cutter blades 120, and an abnormality that has occurred in the power transmission path is typically an attachment failure in which the output shafts 141 and the rotation shafts 121 are improperly attached, or an attachment failure in which the rotation shafts 121 and the cutter blades 120 are improperly attached.

(3) In the above-described embodiment, the power sources of the drive wheel unit 102 are travel motors. However, the travel motors may be replaced with an internal-combustion engine.

(4) In the above-described embodiment, the mower operation part 190 is of a swing lever type. However, the swing lever may be replaced with another type of switch such as a seesaw switch or a dial switch.

(5) The grass mower according to the above-described embodiment is a mid-mount type grass mower in which the mower unit 103 is located between the front wheels and the rear wheels. However, the grass mower may be a front-mount type mower in which the mower unit 103 is located forward of the front wheels.

(6) The grass mower according to the above-described embodiment is a so-called zero-turn type vehicle in which the left rear wheel 102a and the right rear wheel 102b included in the drive wheel unit 102 can be individually driven. However, the grass mower may be a vehicle in which the left rear wheel 102a and the right rear wheel 102b are coupled to each other by a differential mechanism.

(7) The way in which the functional blocks shown in FIG. 10 are distinguished from each other is an example for facilitating understanding of the descriptions. Functional blocks shown in the figure may be integrated into one, and each functional block may further be divided into pieces, as appropriate.

Note that the configurations shown in the above-described embodiments (including the other embodiments, the same applies to the following) may be employed in combination with each other as long as no contradictions occur. Also, the embodiments disclosed in the present specification are merely examples and embodiments of the present invention are not limited thereto. The embodiments may be modified as appropriate within the scope of the purposes of the present invention.

The invention claimed is:

1. An electric travelling vehicle comprising:
a vehicle body;
a power device that includes an electric motor that is driven by being excited, and an electromagnetic power-off brake;
a drive wheel configured to be driven by power from the power device;
a steering operation lever configured to be displaced to a forward travel position, a neutral position, and a rearward travel position from one to another by a manual operation;
a motor controller configured to control the electric motor based on displacement of the steering operation lever;
a brake controller configured to bring the electromagnetic power-off brake into a released state or a braking state;
a brake operation part configured to be switchable between a first position to make a request to the brake controller to bring the electromagnetic power-off brake into the released state and a second position to make a request to the brake controller to bring the electromagnetic power-off brake into the braking state; and
a travel state detector configured to detect a travelling state that is accompanied with the released state, a stopped state that is accompanied with the braking state, and a transit stopped state that is accompanied with the braking state and is a transit state between the stopped state and the travelling state,
wherein a transition from the travelling state to the transit stopped state occurs on a condition that, in the travelling state, the steering operation lever has been returned to the neutral position and a predetermined period of time has elapsed upon a rotational speed of the electric motor decreasing to a very low rotational speed, and a transition from the transit stopped state to the stopped state occurs upon the brake operation part being transitioned from the first position to the second position, and a transition from the stopped state to the transit stopped state occurs upon the brake operation part being transitioned from the second position to the first position.

2. The electric travelling vehicle according to claim 1, wherein a transition from the transit stopped state to the travelling state occurs at least on a condition that, in the transit stopped state, a predetermined period of time has elapsed upon the steering operation lever deviating from the neutral position.

3. The electric travelling vehicle according to claim 1, wherein the travel state detector detects the travelling state on a condition that the steering operation lever has deviated from the neutral position, the electromagnetic power-off brake is in the released state, the electric motor is in an excited state, and the brake operation part is at the first position, the travel state detector detects the stopped state on a condition that the steering operation lever is at the neutral position, the electromagnetic power-off brake is in the braking state, the electric motor is in an unexcited state, and the brake operation part is at the second position, and the travel state detector detects the transit stopped state on a condition that the steering operation lever is at the neutral position, the electromagnetic power-off brake is in the braking state, the electric motor is in an unexcited state, and the brake operation part is at the first position.

4. The electric travelling vehicle according to claim 1, wherein, when the brake operation part is switched from the first position to the second position in the travelling state, the electromagnetic power-off brake enters the braking state and a transition from the travelling state to an emergency stopped state in which the vehicle body is stopped occurs when a predetermined period of time has elapsed upon a no-rotation instruction being output to the electric motor.

* * * * *